(12) United States Patent
Choi et al.

(10) Patent No.: US 12,266,348 B2
(45) Date of Patent: Apr. 1, 2025

(54) IMAGE DISPLAY DEVICE AND VOICE RECOGNITION METHOD THEREFOR

(71) Applicant: LG ELECTRONICS INC., Seoul (KR)

(72) Inventors: Woo Jin Choi, Seoul (KR); Sung Eun Kim, Seoul (KR); Hyun Woo Park, Seoul (KR); Eun Kyung Jung, Seoul (KR); Dae Gon Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 378 days.

(21) Appl. No.: 17/761,303

(22) PCT Filed: Sep. 24, 2019

(86) PCT No.: PCT/KR2019/012380
§ 371 (c)(1),
(2) Date: Mar. 17, 2022

(87) PCT Pub. No.: WO2021/060573
PCT Pub. Date: Apr. 1, 2021

(65) Prior Publication Data
US 2022/0343900 A1 Oct. 27, 2022

(51) Int. Cl.
*G10L 15/08* (2006.01)
*G10L 15/22* (2006.01)

(52) U.S. Cl.
CPC ........ *G10L 15/08* (2013.01); *G10L 2015/088* (2013.01); *G10L 2015/223* (2013.01)

(58) Field of Classification Search
CPC .............. G10L 15/08; G10L 2015/088; G10L 2015/223; G10L 15/28; G10L 17/24;
(Continued)

(56) References Cited

U.S. PATENT DOCUMENTS 10,304,465 B2 * 5/2019 Gunn .................... G06F 1/3206
2014/0163978 A1 * 6/2014 Basye .................... G10L 15/28
704/233
(Continued)

FOREIGN PATENT DOCUMENTS

KR 1020160100765 8/2016
KR 1020160145766 12/2016
(Continued)

OTHER PUBLICATIONS

PCT International Application No. PCT/KR2019/012380, International Search Report dated Jun. 22, 2020, 3 pages.

*Primary Examiner* — Richemond Dorvil
*Assistant Examiner* — Zeeshan Mahmood Shaikh
(74) *Attorney, Agent, or Firm* — LEE, HONG, DEGERMAN, KANG & WAIMEY

(57) ABSTRACT

An image display device and a voice recognition method thereof are proposed. The image display device and voice recognition method thereof stores received first utterance data in a first buffer when a wake up word is recognized from utterance data, stores second utterance data consecutively uttered from a user in a second buffer, stores third utterance data consecutively uttered from the user in a third buffer when verification of the wake up word is successful on the basis of the first utterance data after booting of an operating system is completed, and joins the second uttered data and the third uttered data respectively stored in the second buffer and the third buffer, so as to perform voice recognition for the utterance data consecutively uttered by the user. Accordingly, including the commands uttered at intervals after the wake up word, user's commands that are consecutively uttered may be recognized.

16 Claims, 5 Drawing Sheets

(58) Field of Classification Search
CPC ....... G10L 15/04; G10L 15/22; G06F 1/3215; G06F 1/3265; G06F 1/3278; G06F 1/3287; G06F 3/167; G06F 1/32; G06F 3/16

See application file for complete search history.

(56) References Cited

U.S. PATENT DOCUMENTS

| | | | | |
|---|---|---|---|---|
| 2016/0240194 | A1* | 8/2016 | Lee | G06F 1/3293 |
| 2018/0293974 | A1* | 10/2018 | Georges | G10L 15/183 |
| 2019/0005953 | A1* | 1/2019 | Bundalo | G06F 1/3287 |
| 2021/0233556 | A1* | 7/2021 | Kashima | G10L 15/02 |
| 2022/0122592 | A1* | 4/2022 | Elkhatib | G10L 25/30 |

FOREIGN PATENT DOCUMENTS

| | | |
|---|---|---|
| KR | 1020170046958 | 5/2017 |
| KR | 1020180083587 | 7/2018 |
| KR | 1020190089128 | 7/2019 |

\* cited by examiner

IMAGE DISPLAY DEVICE AND VOICE RECOGNITION METHOD THEREFOR

CROSS-REFERENCE TO RELATED APPLICATIONS

This application is the National Stage filing under 35 U.S.C. 371 of International Application No. PCT/KR2019/012380, filed on Sep. 24, 2019, the contents of which are hereby incorporated by reference herein their entirety.

TECHNICAL FIELD

The present disclosure relates to an image display device and a voice recognition method therefor and, more particularly, to an image display device and a voice recognition method therefor, having a voice recognition function.

BACKGROUND ART

With the development of technology, recently, various services to which voice recognition technology is applied have been introduced in many fields. The voice recognition technology may be a series of processes for recognizing human voice and converting the voice into text information that computers can process, and voice recognition services using the voice recognition technology may include a series of processes for recognizing voices of a user and providing appropriate services corresponding to the voices of the user.

Recently, technology development for applying remote voice recognition technology to video display devices such as TVs is in progress. Since a video display device having such a remote voice recognition function needs to perform detection of a user's wake up word even in a power-off state, power should be supplied to a module for voice recognition.

Meanwhile, many countries around the world are making efforts to reduce power waste by preparing regulations on standby power of electronic devices. However, since the image display device having the remote voice recognition function has to use power for the voice recognition module for detecting the wake up word even in the power-off state, there is a problem that it is difficult to satisfy such standby power regulations.

DISCLOSURE

Technical Problem

An objective of the present disclosure is to provide an image display device and a voice recognition method thereof capable of recognizing user's commands consecutively uttered after a wake up word. Another objective of the present disclosure is to provide an image display device and a voice recognition method thereof having a voice recognition function capable of recognizing consecutively uttered commands while satisfying the minimum power standards in accordance with the standby power regulations. Yet another objective of the present disclosure is to provide an image display device and a voice recognition method thereof capable of storing and securing utterance data while minimizing data loss of a wake up word and commands uttered by a user.

Technical Solution

In order to solve the problems as described above, an image display device and a voice recognition method therefor according to an exemplary embodiment of the present disclosure includes: storing received first utterance data in a first buffer when a wake up word is recognized from the utterance data; storing second utterance data consecutively uttered from a user in a second buffer; storing third utterance data consecutively uttered from the user in a third buffer when verification of the wake up word is successful on the basis of the first utterance data after booting of an operating system is completed; and performing voice recognition for the utterance data consecutively uttered by the user by joining the second utterance data and the third utterance data respectively stored in the second buffer and the third buffer.

The image display device and the voice recognition method therefor according to the exemplary embodiment of the present disclosure may perform the voice recognition by joining the first utterance data, the second utterance data, and the third utterance data respectively stored in the first buffer, the second buffer, and the third buffer.

The image display device and the voice recognition method therefor according to the exemplary embodiment of the present disclosure may generate lost audio data on the basis of continuous characteristics of audio to be joined when joining the first utterance data and the second utterance data or joining the second utterance data and the third utterance data, and insert the lost audio data between the first utterance data and the second utterance data or between the second utterance data and the third utterance data, thereby joining the utterance data.

In the image display device and the voice recognition method therefor according to the exemplary embodiment of the present disclosure, the digital signal processing unit configured to recognize the wake up word may be reset after recognizing the wake up word, and store, in the second buffer, the second uttered data consecutively uttered after the wake up word by a microcontroller during resetting of the digital signal processing unit and booting of the operating system.

Advantageous Effects

As described above, the image display device and the voice recognition method thereof according to the present disclosure may recognize user's commands uttered consecutively, including commands uttered at intervals after a wake up word, whereby there is no need to ask a user for a predetermined pattern in the utterance of the wake up word and commands. The image display device and the voice recognition method thereof according to the present disclosure may perform voice recognition with only minimum power in a suspend mode state, whereby the minimum power standards in accordance with the standby power regulations may be satisfied. The image display device and the voice recognition method thereof according to the present disclosure may store and secure utterance data while minimizing data loss of wake up words and commands uttered by the user.

MODE FOR INVENTION

Figure 1:
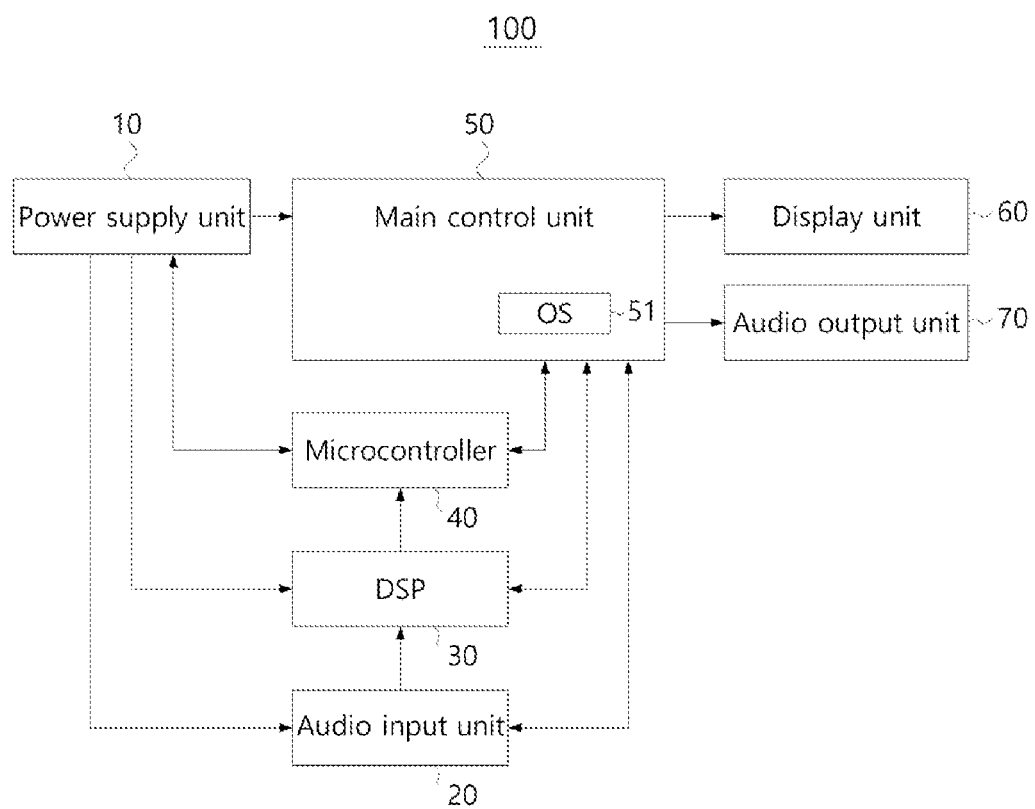
FIG. 1 is a control block diagram of an image display device according to an exemplary embodiment of the present disclosure.

Hereinafter, specific exemplary embodiments of the present disclosure will be described with reference to the drawings.

Advantages and features of the present disclosure, and a method of achieving them will become apparent with reference to the exemplary embodiments described below in detail together with the accompanying drawings. However, the present disclosure is not limited to the exemplary embodiments disclosed below, but will be implemented in a variety of different forms. These exemplary embodiments are provided only to complete the disclosure of the present disclosure and to completely inform the scope of the present disclosure to those skilled in the art to which the present disclosure pertains, and the present disclosure is only defined by the scope of the claims. Like reference numerals generally denote like elements throughout the present disclosure.

FIG. 1 is a control block diagram of an image display device 100 according to the exemplary embodiment of the present disclosure. Referring to FIG. 1, the image display device 100 according to the exemplary embodiment of the present disclosure includes: a power supply unit 10, an audio input unit 20, a digital signal processor (DSP) 30, and a microcontroller 40, a main control unit 50, a display unit 60, and an audio output unit 70.

The image display device 100 according to the exemplary embodiment of the present disclosure may be one of various electronic devices having a display means. For example, the image display device 100 may include an electronic device such as a TV, a monitor, a computer, a tablet PC, and a mobile terminal, which are capable of receiving broadcasts. In the present exemplary embodiment, a TV having a broadcast reception function will be described as an example of the image display device 100.

The power supply unit 10 receives alternating current (AC) power from outside and outputs the AC power as driving power to a plurality of load modules through rectification, smoothing, and transformation into direct current (DC) power. In the present specification, it is assumed that in a state of being connected to AC power, the image display device 100 has three power states, including: a suspend mode, a (warm) stand-by mode, and a normal mode. A meaning of each mode is defined as follows. The suspend mode refers to a minimum power state in which the power of an image display device 100 is turned off, the power of a main control unit 50, a display unit 60, and the like are turned off, and the standby power is supplied only to an audio input unit 20, a DSP, and a microcontroller 40. The stand-by mode refers to a state in which the power is supplied to the main control unit 50 after a user's wake up word is recognized, an OS is booted and operates internally, but the power is not supplied to the display unit 60 and an audio output unit 70. The nonnal mode refers to a state in which the power is supplied to the display unit 60 and the audio output unit 70 after recognition of the wake up word and a power turn-on command, so that the image display device 100 is normally activated and operated. In addition, in the present specification, the wake up word refers to trigger data such as 'Hi, LG', as a pre-arranged command for activating the image display device.

When power of the image display device 100 is in an off state (e.g., suspend mode state) while a power plug is plugged in, the power supply unit 10 according to the exemplary embodiment of the present disclosure supplies standby power to the audio input unit 20, the DSP, and the microcontroller 40 with power applied from an AC power supply. When the user's utterance of a wake up word is recognized, the power supply unit 10 applies driving power to the main control unit 50 so that an OS 51 of the main control unit 50 may boot. When a user's power turn-on command is recognized, the power supply unit 10 applies driving power to the display unit 60 and the audio output unit 70, so as to allow the same to operate normally.

The audio input unit 20 is for detecting an audio signal, for example, utterance data of a user, and includes a microphone. The audio input unit 20 may receive an external audio signal by the microphone and process the audio signal as electrical voice data. The audio input unit 20 receives an analog audio signal and converts the received analog audio signal into a digital audio signal. The audio input unit 20 may include at least one or more microphones installed on a front or a side of the image display device 100.

The digital signal processor 30 is for recognizing a wake up word by receiving user's utterance data received from the audio input unit 20, and temporarily stores first utterance data received from the audio input unit 20 into a first buffer. The digital signal processor 30 is used as a means for recognizing the user's wake up word in the suspend mode state, and may perform other functions such as frequency conversion of an audio signal and the like in the normal mode state. The digital signal processor 30 is reset after recognizing the wake up word.

When the digital signal processor 30 recognizes a wake up word, the microcontroller 40 controls the OS 51 of the power control unit to boot by outputting a first command, for example, a power-on signal, and resets the digital signal processor 30. Meanwhile, the microcontroller 40 receives consecutively uttered second utterance data through the audio input unit 20 and temporarily stores the received second utterance data in a second buffer.

Because of being initialized according to a reset command of the microcontroller 40 together with OS booting after recognizing a wake up word, the digital signal processor 30 is unable to perform the function of storing the user's utterance data consecutively uttered after the wake up word. In addition, the OS 51 of the main control unit 50, which will be described later, may not store utterance data during booting. Meanwhile, the digital signal processor 30 and the main control unit 50 may perform complex operations such as voice recognition, but the microcontroller 40 may be able to perform the role of data storage even though processor capability thereof is insufficient to perform the voice recognition, so the embodiment of the present disclosure allows the microcontroller 40 to temporarily store the consecutively uttered second utterance data of the user when in a section in which the digital signal processor 30 and the main control unit 50 are unable to operate due to the resetting and booting, whereby the user's command consecutively uttered after the wake up word may be stored. In this case, indicators of the microcontroller 40 may be dedicated to serve in the digital signal processor 30 and the main control unit 50.

The main control unit 50 is responsible for overall control of the image display device 100 by a user command or an internal program. The main control unit 50 may process a video signal and/or an audio signal, which are received from the signal receiving unit (not shown), according to an image reproduction command from a user, and control the video signal and/or audio signal to be respectively output to the video signal and/or audio signal to the display unit 60 and/or the audio output unit 70. The control unit may be implemented to include: a program code for signal processing and control; a memory for storing the program code, and a processor executing the program code; and various operating systems (OS), middleware, platforms, and various applications. In addition, the main control unit 50 includes a signal processing module and an algorithm for voice recognition.

The main control unit 50 includes an OS 51 (e.g., webOS), wherein the OS 51 not only manages system hardware but also provides a hardware abstraction platform and common system services in order to execute application software. The OS 51 stored in the main control unit 50 is booted in response to a first command of the microcontroller 40, for example, a power-on signal in a power-off state. When booting is completed, the OS 51 of the main control unit 50 receives the first utterance data stored by the digital signal processor 30 and verifies a wake up word through the voice recognition function. In response to the first command of the microcontroller 40, for example, the power-on signal, the power supply unit 10 supplies driving power to the main control unit 50, and the image display device 100 is switched from the suspend mode to the (warm) stand-by mode.

When the OS 51 of the main control unit 50 succeeds in verifying the wake up word, the OS 51 is provided with the second utterance data temporarily stored in the second buffer, and also receives in real time consecutively uttered third utterance data through the audio input unit 20, thereby temporarily storing the third utterance data in the third buffer. The OS 51 of the main control unit 50 joins the first utterance data stored in the first buffer, the second utterance data stored in the second buffer, and the third utterance data stored in the third buffer, so as to perform voice recognition, that is, user command recognition. The main control unit 50 controls the image display device 100 in response to a user's command recognized through the voice recognition. For example, when it is determined that the user's power turn-on command is input through voice recognition, the main control unit 50 applies a control signal to the power supply unit 10, and controls driving power to be supplied to the display unit 60 and the audio output unit 70. That is, when the user's power turn-on command is recognized, the state of the image display device 100 is switched from the stand-by mode to the normal mode. Whereas, in the main control unit 50, when the wake up word verification fails or the power turn-on command is not input from the user, the main control unit 50 is turned off and the image display device 100 is switched back to the suspend mode.

Each of the digital signal processing unit 30, the microcontroller 40, and the main control unit 50 (with the OS 51) according to the exemplary embodiment of the present disclosure is a system in which each module therein is independent, and each system includes a separate booting area and a data area capable of storing data. As described above, the first buffer refers to a memory area accessible by the digital signal processing unit 30, the second buffer refers to a memory area accessible by the microcontroller 40, and the third buffer refers to a memory area accessible by the main control unit 50 (e.g., the OS 51). Here, each of the first buffer, the second buffer, and the third buffer may be a part of memory area respectively provided insides or outsides the digital signal processing unit 30, the microcontroller 40, and the main control unit 50 (with OS 51). The digital signal processing unit 30, the microcontroller 40, and the main control unit 50 according to the exemplary embodiment of the present disclosure may be configured separately, but may be implemented by being integrated into one chip in the form of a main system on chip (SoC).

The display unit 60 is for receiving an image processed by the main control unit 50 and displaying the image on a screen, and may be implemented by a liquid crystal display (LCD) panel, a light emitting diode (LED) panel, and an organic light emitting diode (OLED) panel, or the like. The display unit 60 includes a display module for displaying images and a display driver for driving the display module.

The audio output unit 70 is for receiving and outputting an audio signal processed by the main control unit 50, and may include various types of speakers.

Figure 2:
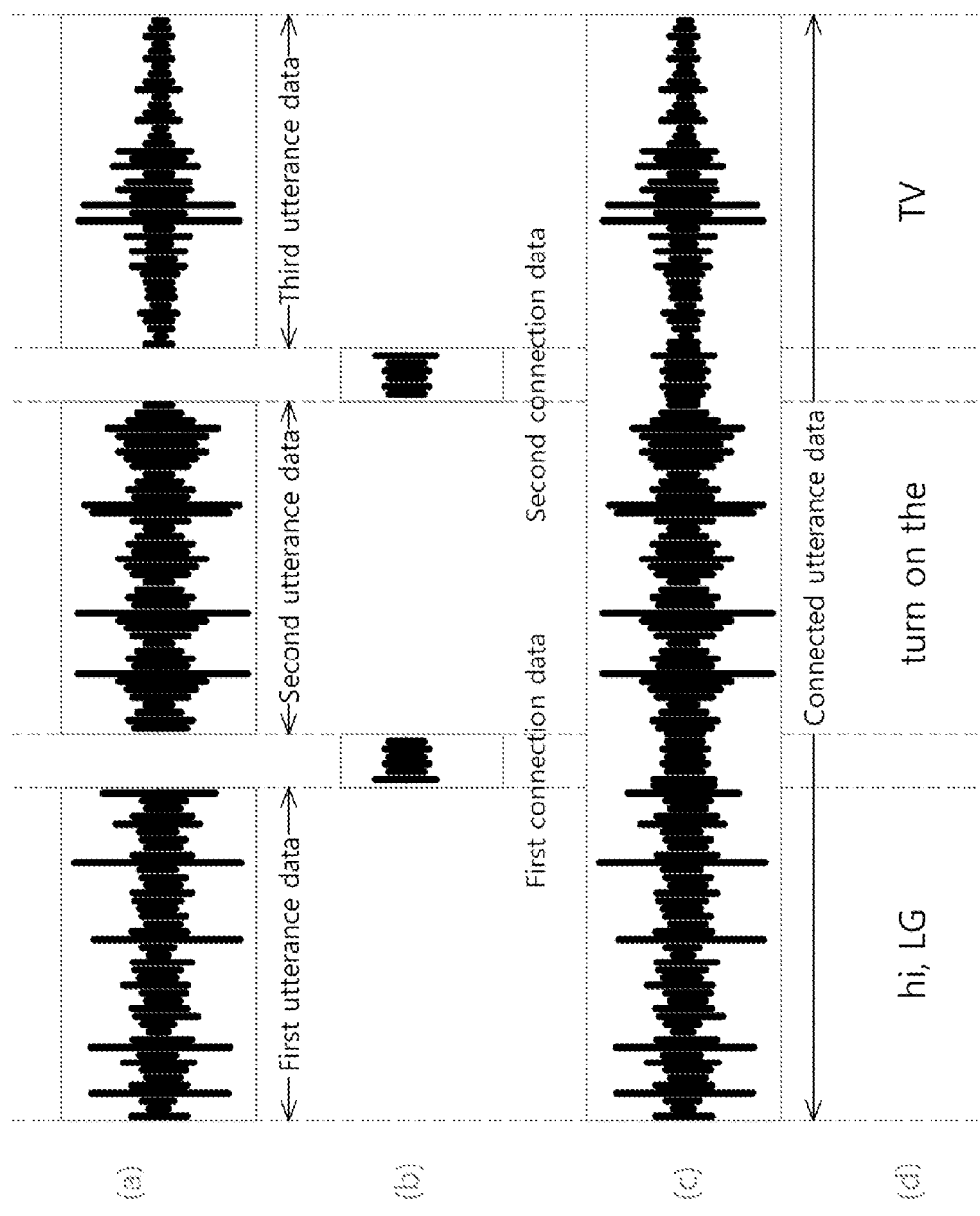
FIG. 2 is a view illustrating a method of recognizing user's utterance data according to the exemplary embodiment of the present disclosure.

FIG. 2 is a view illustrating the method of recognizing user's utterance data according to the exemplary embodiment of the present disclosure. Referring to FIG. 2, FIG. 2(*a*) illustrates an example of the user's utterance data received through the audio input unit 20 and illustrates the first utterance data stored in the first buffer by the digital signal processing unit 30, the second utterance data stored in the second buffer by the microcontroller 40, and the third utterance data stored in the third buffer by the OS 51 of the main control unit 50. The OS 51 of the main control unit 50 is provided with the first utterance data and the second utterance data respectively sent from the digital signal processing unit 30 and the microcontroller 40, and joins the first and second utterance data with the third utterance data stored by the OS 51 itself.

The first utterance data refers to data that is continuously received from the audio input unit 20 by the digital signal processing unit 30 and buffered until a point in time when a wake up word is detected. The second utterance data refers to data buffered by the microcontroller 40 from a point in time immediately after detecting the wake up word until a point in time when the main control unit 50 requests the data from the microcontroller 40. The third utterance data refers to data transmitted in real time from the audio input unit 20 from a point in time when the main control unit 50 requests the data from the microcontroller 40.

In this case, since a main entity responsible for temporal storing of the user's utterance data is switched from the digital signal processing unit 30, to the microcontroller 40, and to the OS 51 of the main control unit 50 in a row, data loss occurs among pieces of temporarily stored utterance data at the time of switching. When joining the first utterance data and the second utterance data or joining the second utterance data and the third utterance data, the OS 51 of the main control unit 50 generates lost audio data on the basis of the continuous characteristics of the audio to be joined, and inserts the lost audio data between the first utterance data and the second utterance data or between the second utterance data and the third utterance data.

FIG. 2(*b*) illustrates a first connection data inserted between the first utterance data and the second utterance data, and a second connection data inserted between the second utterance data and the third utterance data. The data loss at the time of switching is approximately 10 samples or less. The embodiment of the present disclosure allows the microcontroller 40 to perform a buffering function for the consecutive utterance data, so as to minimize the data loss at the time of switching and further generate and add the lost data according to the characteristics of audio to be joined, whereby the performance of voice recognition may be further improved.

FIG. 2(c) illustrates an audio stream in which the first utterance data, second utterance data, and third utterance data are joined with respective pieces of connection data. FIG. 2(d) illustrates the result of voice recognition performance on the joined audio stream by the main control unit 50. As a result of the voice recognition, when voices are recognized as "Hi, LG. Turn on the TV", the "Hi, LG" corresponds to a wake up word and "Turn on the TV" corresponds to a command. At a point in time when the "Turn on the TV" command is recognized, the main control unit 50 stops audio stream transmission of the audio input unit 20 and outputs a power-on signal to the power supply unit 10, so as to control the power supply unit 10 to supply driving power to the display unit 60 and the audio output unit 70.

Conventionally, since the audio signal is unable to be stored during the resetting of the digital signal processing unit 30 and the booting of the OS, the commands consecutively uttered after a wake up word are unable to be recognized. Accordingly, when a user utters the wake up word, a signal such as "Ting-a-ling", which is a kind of feedback, is output after detecting the wake up word in the image display device 100, so that a command such as "Turn on the TV" is uttered after the user hears the "Ting-a-ling" feedback signal, whereby the command is recognized. Accordingly, such a conventional voice recognition system is unable to recognize the user's commands consecutively uttered after the wake up word is uttered. For example, because of being unable to store the data corresponding to "Turn on the" buffered by the microcontroller 40 in FIG. 2, the conventional OS 51 of the main control unit 50 recognizes only "Hi, LG. TV", and thus is unable to properly execute the command. The embodiment of the present disclosure allows the microcontroller 40 to perform the function of data storage during resetting of the digital signal processing unit 30 and booting of the OS, so that the "Turn on the" part, which is consecutively uttered after uttering the wake up word, may also be stored without being lost, and thus, the user's command may be recognized properly.

Figure 3:
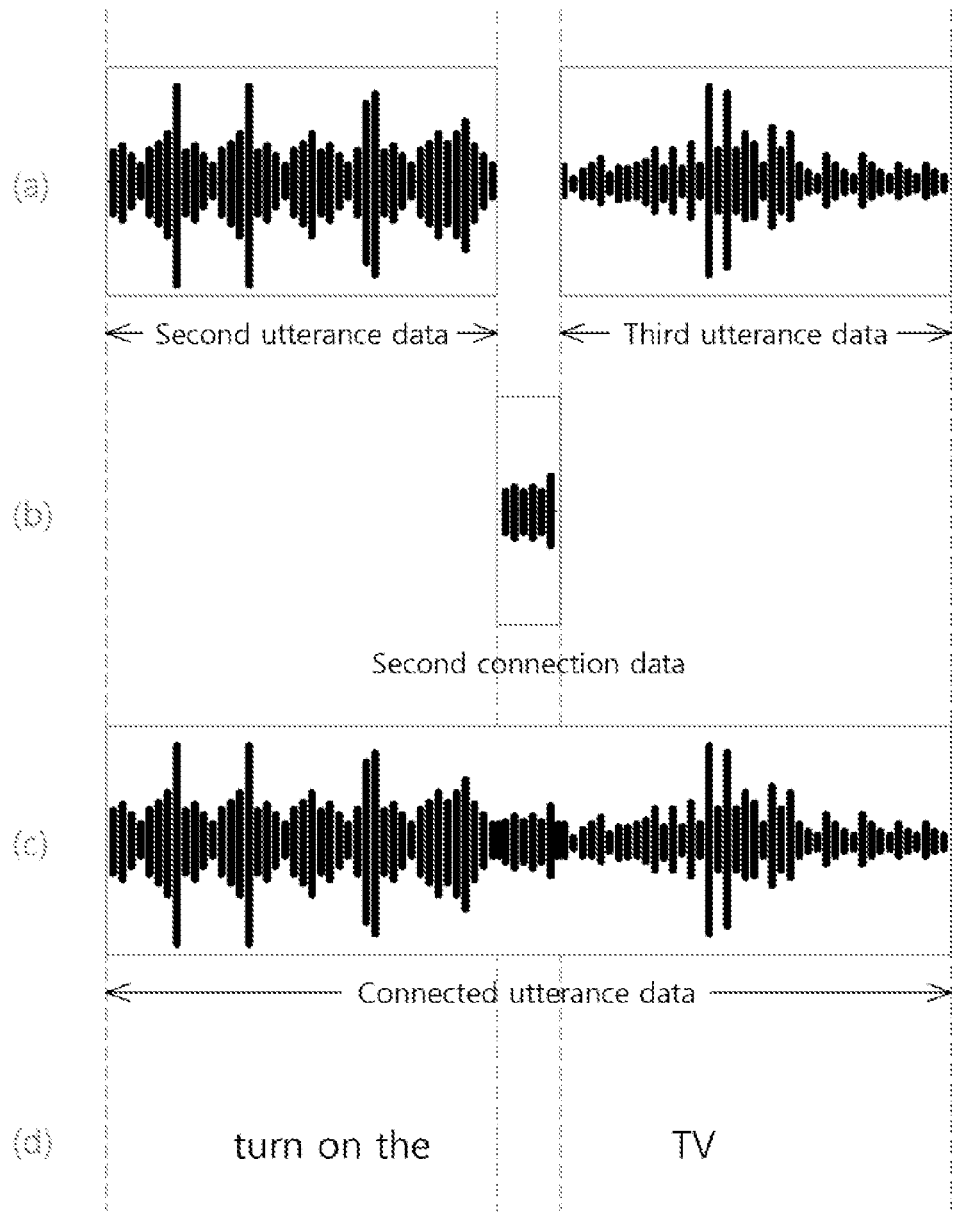
FIG. 3 is a view illustrating a method of recognizing user's utterance data according to another exemplary embodiment of the present disclosure.

FIG. 3 is a view illustrating the method of recognizing user's utterance data according to another exemplary embodiment of the present disclosure. In the above-described exemplary embodiment, it has been described that voice recognition is performed by joining all of the first utterance data, the second utterance data, and the third utterance data, but since the wake up word recognition and verification from the first utterance data have been completed, only the second utterance data and the third utterance data except for the first utterance data may be joined to recognize a user's command consecutively uttered after the wake up word as well. A duplicate description will be omitted.

Referring to FIG. 3, the main control unit 50 generates second connection data and joins the same between the second utterance data buffered by the microcontroller 40 and the third utterance data buffered in real time by the main control unit 50 itself, so as to join the whole utterance data and perform voice recognition. The main control unit 50 performs the voice recognition, stops the audio stream transmission of the audio input unit 20 at a point in time when "Turn on the TV" is recognized, and outputs a power-on signal to the power supply unit 10, so as to control the power supply unit 10 to supply driving power to the display unit 60 and the audio output unit 70.

Figure 4:
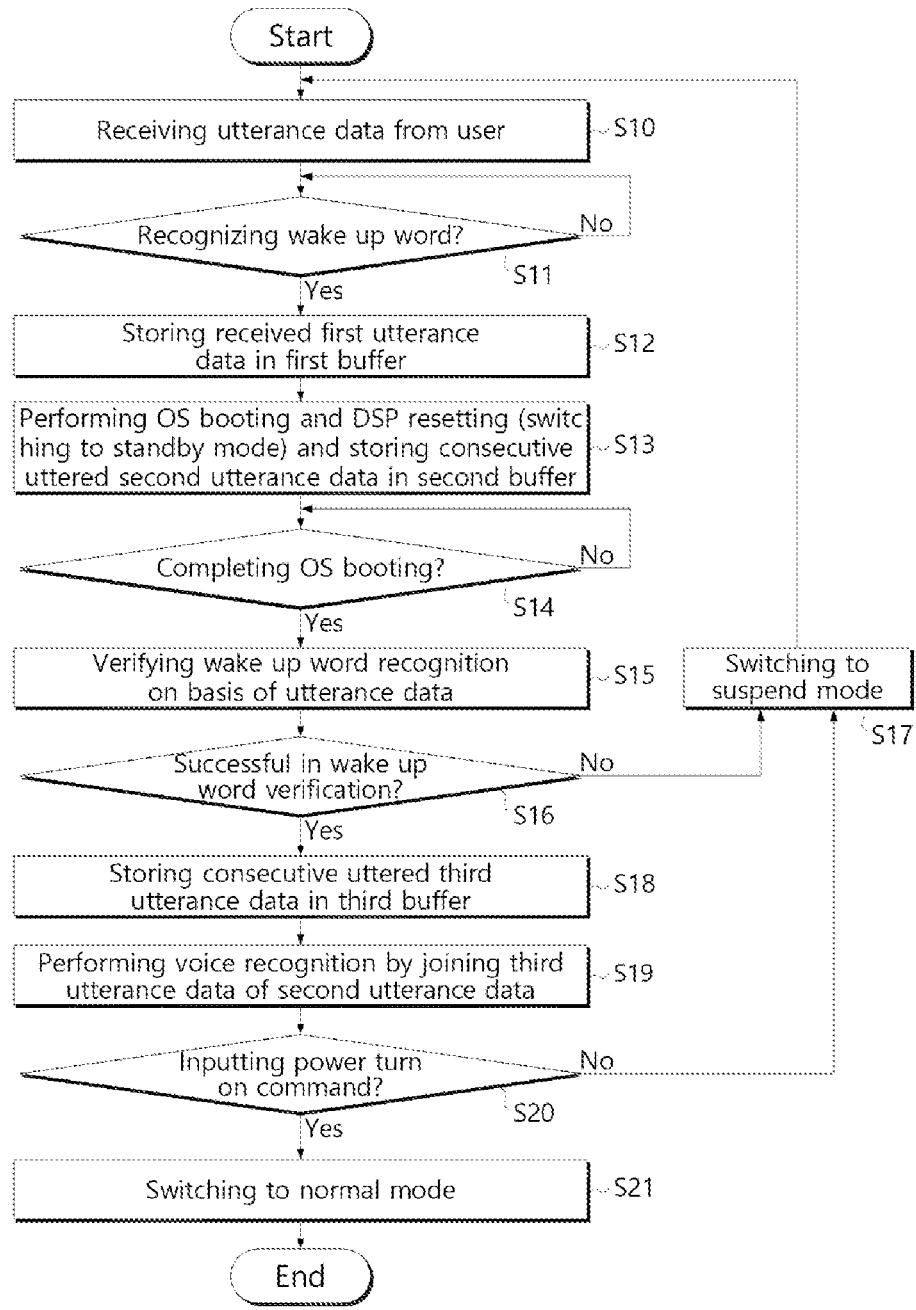
FIG. 4 is a flowchart illustrating a voice recognition method of the image display device according to the exemplary embodiment of the present disclosure.

FIG. 4 is a flowchart illustrating the voice recognition method of the image display device 100 according to the exemplary embodiment of the present disclosure. Referring to FIG. 4, in a state of turning off the power and being in the suspend mode, the image display device 100 operates in a minimum power save mode that is a state where the power is input only to the audio input unit 20, the digital signal processing unit 30, and the microcontroller 40. In step S10, the audio input unit 20 receives utterance data from the user. When the utterance data received from the user is buffered, and voice recognition is performed to detect a wake up word, for example, "Hi, LG." in step S11, the detected first utterance data is stored in a first buffer in step S12. After the wake up word is detected, the booting of the OS and resetting of the digital signal processing unit 30 are performed, and the image display device 100 is switched from a suspend mode to a (warm) stand-by mode according to the booting of the OS. In this case, in step S13, the microcontroller 40 is given a data storage function, and temporarily stores, in a second buffer, the second utterance data consecutively uttered after the wake up word.

In a case where the booting of the OS is completed in step S14, the main control unit 50 is provided with the first utterance data stored by the digital signal processing unit 30, and verifies the wake up word in step S15. In a case where the wake up word verification is successful in step S16, the main control unit 50 buffers in real time the consecutively uttered third utterance data in the third buffer in step S18. In a case where the wake up word verification is not successful in step S17, the state of the image display device 100 is switched from the (warm) stand-by mode to the suspend mode in step S17.

When the wake up word verification is successful, the main control unit 50 requests the buffered data from the microcontroller 40 to receive second utterance data, and performs voice recognition by joining the second utterance data with the third utterance data being buffered in real time in step S19. The microcontroller 40 stops buffering in response to the request for the buffered data from the main control unit 50 and transmits the corresponding data to the main control unit 50. In a case where a power turn-on command from the user, for example, "Turn on the TV" is recognized as a result of performing the voice recognition of the joined utterance data in step 20, the main control unit 50 outputs a power-on signal to the power supply unit 10 of the image display device 100, so as to supply driving power to the display unit 60 and audio output unit 70, thereby allowing the image display device 100 to be switched to normal mode in step S21.

Figure 5:
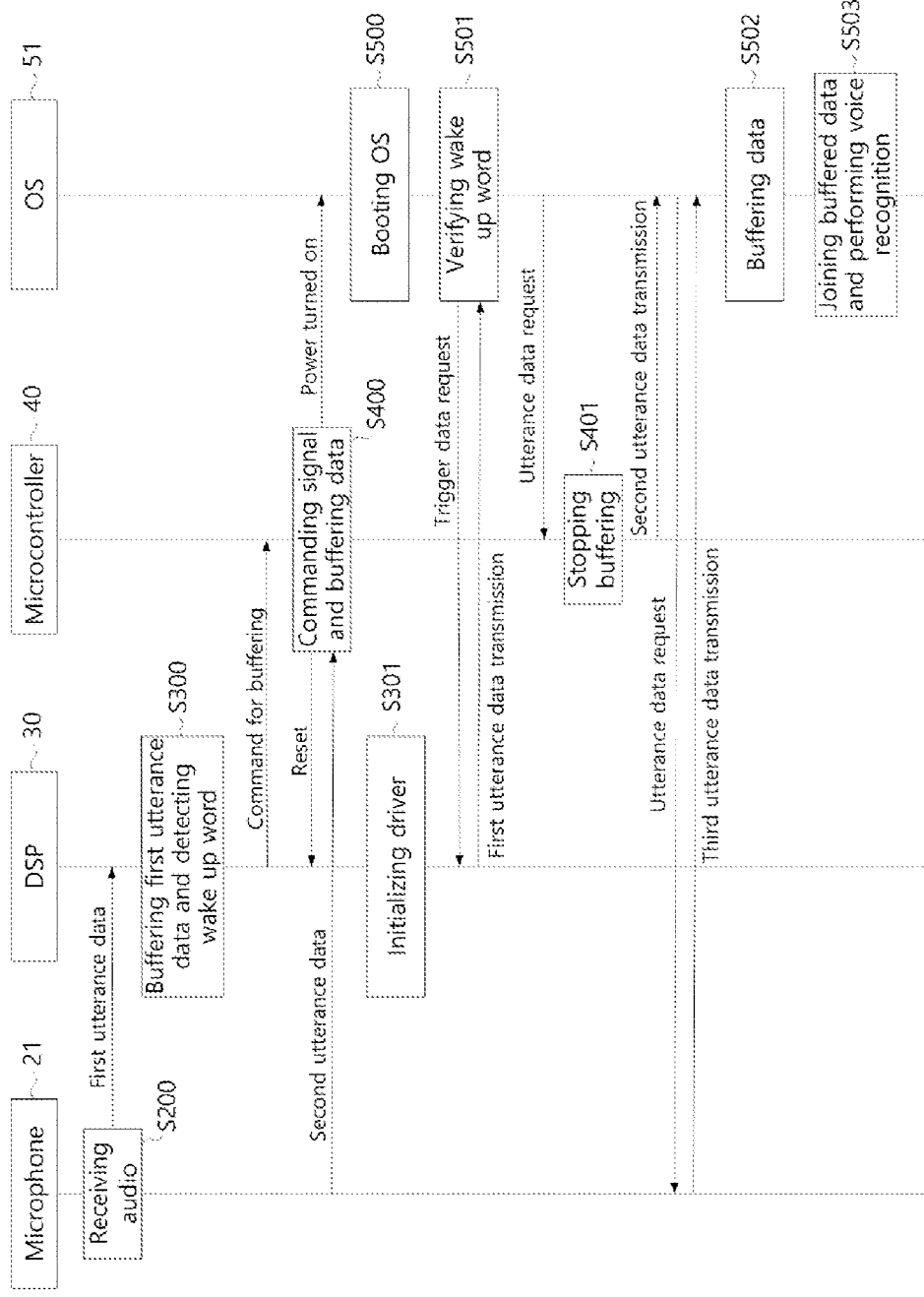
FIG. 5 is a flowchart illustrating an operation of each component in the voice recognition method of the image display device according to the exemplary embodiment of the present disclosure.

FIG. 5 is a flowchart illustrating the operation of each component in the voice recognition method of the image display device 100 according to the exemplary embodiment of the present disclosure. Referring to FIG. 5, in step S200, the microphone 21 continuously receives audio data. In step S300, first utterance data first uttered is transmitted to the digital signal processing unit 30, and the digital signal processing unit 30 buffers the first utterance data input through the audio input unit 20 in the first buffer and detects a wake up word. In S400, in a case where the wake up word is detected, the digital signal processing unit 30 transmits a signal or a buffering command, which notifies that the wake up word is detected, to the microcontroller 40, and the microcontroller 40 outputs a power-on signal to the main control unit 50 in response to the detection of the wake up word by the digital signal processing unit 30 so as to enable the OS 51 to boot, and while applying a reset signal to the digital signal processing unit 30 for initialization, the microcontroller 40 temporarily stores second utterance data consecutively uttered after the wake up word in the second buffer.

When the booting of the OS 51 is completed in the main control unit 50 in step S500, the OS 51 activates the voice recognition function, requests a trigger signal, that is, the first utterance data including the wake up word, to the digital signal processing unit 30, and receives the first utterance data, so as to verify the wake up word in step S501. In step S401, in a case where the wake up word verification is successful, the OS 51 requests the second utterance data to the microcontroller 40, and in response to this request, the microcontroller 40 stops buffering and provides the second utterance data to the main control unit 50.

Meanwhile, the main control unit 50 requests third utterance data detected from the microphone 21, receives the third utterance data in real time, and stores the third utterance data in the third buffer in step S502, and joins the second utterance data temporarily stored in the microcontroller 40 with the third utterance data buffered in real time, so as to perform voice recognition in step S503. When the power turn-on command such as "Turn on the TV" is recognized through the voice recognition, the main control unit 50 enables the TV to switch to the normal mode. Whereas when the wake up word verification fails or the user's command recognition fails, the main control unit 50 enables the video display device 100 to switch to the suspend mode.

Meanwhile, the operation method of the image display device 100 of the present disclosure may be implemented as processor-readable codes on a processor-readable recording medium provided in the image display device 100. The processor-readable recording medium includes all types of recording devices in which data readable by the processor is stored. Examples of the processor-readable recording medium include ROM, RAM, CD-ROM, magnetic tape, floppy disks, optical data storage devices, and the like, and also includes those implemented in the thrill of carrier waves such as transmission over the Internet. In addition, the processor-readable recording medium is distributed in a computer system connected to a network, so that the processor-readable code may be stored and executed in a distributed method.

In addition, in the above, the preferred exemplary embodiments of the present disclosure have been illustrated and described, but the present disclosure is not limited to the specific exemplary embodiments described above. In the present disclosure, various modifications may be possible by those skilled in the art to which the present disclosure belongs without departing from the spirit of the present disclosure claimed in the claims, and these modifications should not be understood individually from the technical ideas or prospect of the present disclosure.

What is claimed is:

1. An image display device, comprising:
   a microphone configured to receive utterance data in a suspend mode state;
   a digital signal processor comprising a first buffer, and configured to receive first utterance data from the— microphone, recognize a trigger word in the suspend mode state, temporarily store the first utterance data in the first buffer, and transmit a buffering command to a microcontroller when the trigger word is recognized;
   wherein the microcontroller comprises a second buffer, and is configured to output a first command-to a main controller, transmit a reset command to the digital signal processor, receive second utterance data subsequent to the first utterance data from the microphone, and temporarily store the second utterance data in the second buffer in response to the buffering command; and
   the main controller is configured to boot in response to the first command, request and receive the first utterance data to the digital signal processor, verify the trigger word on a basis of the first utterance data, when verification of the trigger word is successful, request and receive the second utterance data to the microcontroller, request and receive a third utterance data to the microphone, and join the third utterance data and the second utterance data stored in the second buffer, to perform voice recognition;
   wherein the microcontroller starts storing the second utterance data in response to the buffering command, and stops storing the second utterance data in response to a request for the second utterance data from the main controller,
   wherein the image display device switches from the suspend mode state to a standby mode state according to the first command.

2. The image display device of claim 1, wherein the main controller comprises a third buffer, stores the third utterance data in the third buffer, and joins the first uttered data, the second uttered data, and the third uttered data respectively stored in the first buffer, the second buffer, and the third buffer, so as to perform the voice recognition.

3. The image display device of claim 2, wherein when joining the first utterance data and the second utterance data or joining the second utterance data and the third utterance data, the main controller generates lost audio data on a basis of continuous characteristics of audio to be joined, so as to insert the lost audio data between the first utterance data and the second utterance data or between the second utterance data and the third utterance data.

4. The image display device of claim 3, further comprising:
   a power supply unit configured to supply power to the microphone, the digital signal processor, the microcontroller, and the main controller; and
   a display unit configured to display an image,
   wherein the power supply unit supplies driving power to the microphone, the digital signal processor, and the microcontroller in the suspend mode state, and supplies the driving power to the main controller in response to the first command of the microcontroller, and
   the main controller controls the power supply unit to supply the driving power to the display unit when recognizing that a power turn-on command has been input from a user in response to a voice recognition result.

5. The image display device of claim 2, further comprising:
   a power supply unit configured to supply power to the microphone, the digital signal processor, the microcontroller, and the main controller; and
   a display unit configured to display an image,
   wherein the power supply unit supplies driving power to the microphone, the digital signal processor, and the microcontroller in the suspend mode state, and supplies the driving power to the main controller in response to the first command of the microcontroller, and
   the main controller controls the power supply unit to supply the driving power to the display unit when recognizing that a power turn-on command has been input from a user in response to a voice recognition result.

6. The image display device of claim 5, wherein when the trigger word is recognized, the digital signal processor transmits a trigger word recognition signal to the microcontroller, and the microcontroller transmits a reset command to the digital signal processor in response to the recognition of the trigger word, and outputs the first command to the main controller.

7. The image display device of claim 1, further comprising:
a power supply unit configured to supply power to the microphone, the digital signal processor, the microcontroller, and the main controller; and
a display unit configured to display an image,
wherein the power supply unit supplies driving power to the microphone, the digital signal processor, and the microcontroller in the suspend mode state, and supplies the driving power to the main controller in response to the first command of the microcontroller, and
the main controller controls the power supply unit to supply the driving power to the display unit to operate in a normal mode state when recognizing that a power turn-on command has been input from a user in response to a voice recognition result.

8. The image display device of claim 7, wherein the image display device is switched from the suspend mode state to the stand-by mode state in response to the first command of the microcontroller.

9. The image display device of claim 8, wherein when the main controller recognizes that the power turn-on command has been input from the user, the image display device is switched from the stand-by mode state to the normal mode state, and the image display device is switched from the stand-by mode state to the suspend mode state when the trigger word fails the verification, or the power turn-on command from the user is not recognized as input.

10. The image display device of claim 1, further comprising:
a power supply unit configured to supply power to the microphone, the digital signal processor, the microcontroller, and the main controller; and
a display unit configured to display an image,
wherein the power supply unit supplies driving power to the microphone, the digital signal processor, and the microcontroller in the suspend mode state, and supplies the driving power to the main controller in response to the first command of the microcontroller, and
the main controller controls the power supply unit to supply the driving power to the display unit when recognizing that a power turn-on command has been input from a user in response to a voice recognition result.

11. The image display device of claim 10, wherein when the trigger word is recognized, the digital signal processor transmits a trigger word recognition signal to the microcontroller, and the microcontroller transmits a reset command to the digital signal processor in response to the recognition of the trigger word, and outputs the first command to the main controller.

12. A voice recognition method of an image display device, the method comprising:
receiving a first utterance data from a user in a suspend mode state, at a microphone;
storing the received first utterance data in a first buffer when a trigger word is recognized from the first utterance data, and transmitting a buffering command to a microcontroller, by a digital signal processor;
in response to the buffering command, transmitting a power-on signal for an operating system, transmitting a reset command to the digital signal processor, receiving second utterance data subsequent to the first utterance data from the microphone, and temporarily storing the second utterance data in a second buffer, in the microcontroller;
switching, for the image display device, from a suspend mode state to a stand-by mode state according to the power-on signal of the operating system;
requesting and receiving the first utterance data to the digital signal processor, verifying the recognition of the trigger word on a basis of the first utterance data when booting of the operating system is completed;
when verification of the trigger word is successful, requesting and receiving the second utterance data to the microcontroller, requesting and receiving a third utterance data subsequent to the second utterance data to the microphone, and joining the third utterance data and the second utterance data stored in the second buffer, to perform voice recognition; and
performing the voice recognition by joining the second utterance data and the third utterance data respectively stored in the second buffer and a third buffer.

13. The method of claim 12, wherein the performing of the voice recognition performs the voice recognition by joining the first utterance data, the second utterance data, and the third utterance data respectively stored in the first buffer, the second buffer, and the third buffer.

14. The method of claim 13, wherein, when joining the first utterance data and the second utterance data or joining the second utterance data and the third utterance data, the performing of the voice recognition generates lost audio data on a basis of continuous characteristics of the audio to be joined, so as to insert the lost audio data between the first utterance data and the second utterance data, or between the second utterance data and the third utterance data.

15. The method of claim 13, further comprising:
switching, for the display device, from the stand-by mode state to a normal mode state when it is determined that a power turn-on command is input from the user as a result of the performing of the voice recognition.

16. The method of claim 13, further comprising:
switching, for the image display device, from the stand-by mode state to the suspend mode state when the trigger word fails verification or when a power turn-on command from the user is not recognized as input.

* * * * *